United States Patent
Oosawa et al.

(10) Patent No.: US 7,162,902 B2
(45) Date of Patent: Jan. 16, 2007

(54) METHOD FOR DRAWING BRASS-PLATED STEEL WIRE

(75) Inventors: Ryuzo Oosawa, Tokyo (JP); Tadasi Honna, Tokyo (JP); Hisakatsu Hara, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 11/053,867

(22) Filed: Feb. 10, 2005

(65) Prior Publication Data

US 2005/0147818 A1    Jul. 7, 2005

Related U.S. Application Data

(62) Division of application No. 10/258,123, filed as application No. PCT/JP02/01556 on Feb. 21, 2002.

(30) Foreign Application Priority Data

| Feb. 21, 2001 | (JP) | 2001-044438 |
| Nov. 21, 2001 | (JP) | 2001-356341 |
| Nov. 27, 2001 | (JP) | 2001-360328 |
| Nov. 27, 2001 | (JP) | 2001-360826 |

(51) Int. Cl.
*B21C 9/00* (2006.01)
*B21C 3/02* (2006.01)

(52) U.S. Cl. ............................ 72/41; 72/47; 72/274

(58) Field of Classification Search ............ 72/274, 72/47, 41
See application file for complete search history.

(56) References Cited

U.S. PATENT DOCUMENTS

| 4,283,450 A | 8/1981 | Shemenski, Sr. |
| 4,304,113 A | 12/1981 | Takei et al. |
| 4,704,337 A | 11/1987 | Coppens et al. |
| 4,725,340 A | 2/1988 | De Filippo et al. |
| 4,828,000 A | 5/1989 | Lievens et al. |
| 4,883,722 A | 11/1989 | Coppens et al. |
| 5,437,748 A | 8/1995 | Bhagwat et al. |
| 5,772,809 A | 6/1998 | Yanagisawa |
| 5,956,935 A * | 9/1999 | Katayama et al. ............ 57/212 |
| 6,203,932 B1 | 3/2001 | Hisakatu |
| 2002/0088522 A1 | 7/2002 | Uchino et al. |
| 2002/0166614 A1 | 11/2002 | Nakata |

FOREIGN PATENT DOCUMENTS

| EP | 0 257 667 A1 | 3/1988 |
| EP | 0 314 230 A1 | 5/1989 |

(Continued)

*Primary Examiner*—Daniel C. Crane
(74) *Attorney, Agent, or Firm*—Sughrue Mion, PLLC

(57) ABSTRACT

This invention relates to steel wires and steel cords used as a reinforcement for rubber articles such as pneumatic tire, industrial belt and the like, particularly steel wires and steel cords having an excellent adhesion property to rubber, in which an amount of phosphorus included as an oxide in a surface layer region from a brass plated surface applied to a circumferential face of a wire up to a depth of 5 nm in a radial direction of the wire is controlled to not more than 1.5 atomic %, whereby an excellent adhesion property between steel cord and coating rubber can be provided even when an adhesion promoter conventionally added in a coating rubber composition for the steel cord is reduced or is not added.

11 Claims, 4 Drawing Sheets

FOREIGN PATENT DOCUMENTS

| | | |
|---|---|---|
| JP | 61-190082 A | 8/1986 |
| JP | 06-049783 A | 2/1994 |
| JP | 8-155532 A | 6/1996 |
| JP | 2001-234371 A | 8/2001 |
| WO | WO 97/23311 A | 7/1997 |

\* cited by examiner (a)

(b)

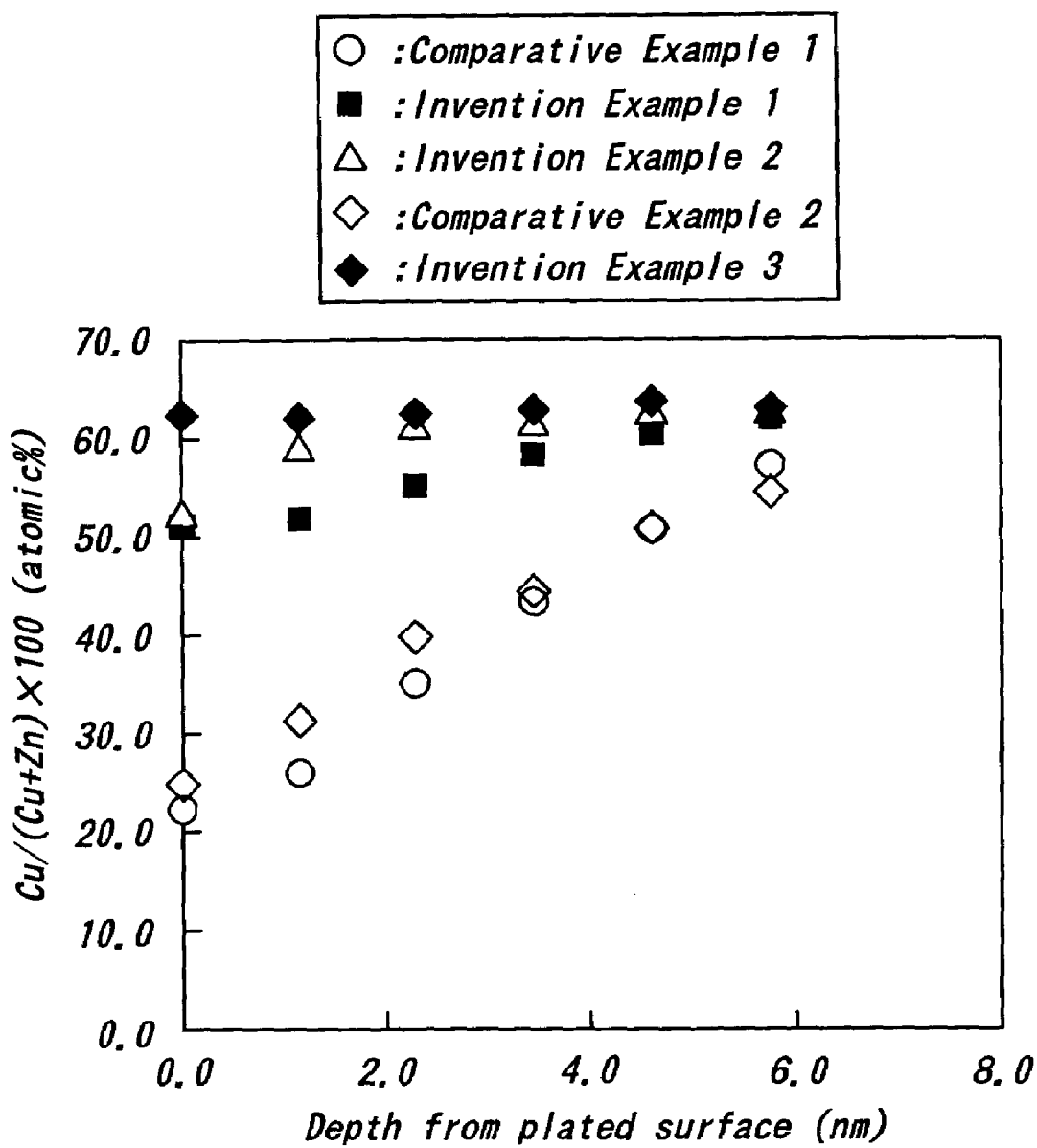

METHOD FOR DRAWING BRASS-PLATED STEEL WIRE

This is a divisional application of Ser. No. 10/258,123 filed Oct. 21, 2002, now abandoned which is a §371 of PCT/JP02/01556 filed Feb. 21, 2002, the disclosures of both of which are incorporated herein by reference.

TECHNICAL FIELD

This invention relates to a steel wire and a steel cord used as a reinforcing member for rubber articles such as a pneumatic tire, an industrial belt and the like, and more particularly to a steel wire and a steel cord having an excellent adhesion property to rubber.

BACKGROUND ART

In pneumatic tires as a typical example of the rubber article, it is attempted to mainly conduct the reinforcement with steel cords by applying a rubberized steel cord made by twisting a plurality of brass-plated steel filaments or made of a single steel filament to a belt or a carcass. In order to utilize the steel cord as a reinforcing member for the tire, it is required to surely adhere the steel cord to a coating rubber, and hence a peripheral face of a filament constituting the steel cord is subjected to a brass plating.

As to the brass plating, it is examined to adjust a ratio of copper to zinc in the brass, a plated thickness and the like for ensuring the adhesion property to rubber, and hence a fixed knowledge therefor is established.

By subjecting the filament constituting the steel cord to an adjusted brass plating based on the above knowledge is improved the adhesion property to rubber. Nevertheless, various conditions are required to rubber to be adhered. For example, it is required to ensure a sufficient adhesion force by an adhesion rate between cord and rubber or a complete bonding therebetween for curing and building a tire in a certain time. That is, a so-called initial adhesion property is required, so that it is necessary to add a sufficient ratio of Co salt or Ni salt as an adhesion promoter to rubber or to compound sulfur at a higher ratio.

The thus added adhesion promoter including sulfur is effective to promote the adhesion reaction, but causes the oozing of the adhesion promoter from the uncured rubber or so-called blooming of chemicals. As a result, the operability in the plying of the uncured rubber sheet at, for example, a tire building step lowers and also the closing property or adhesion property between the uncured rubber sheet and rubber is obstructed and further a residue of the adhesion promoter in a cured rubber causes a cutting reaction of rubber molecule or a reversion, which result in the lowering of the tire durability.

From a viewpoint of preventing the occurrence of such problems, it is attempted to improve the adhesion property between a rubber composition containing no adhesion promoter and a cord by changing a kind of the adhesion promoter, particularly a kind of an acid in Co salt or Ni salt, or by locating the adhesion promoter (cobalt metal salt) as a thin film between the coating rubber and the cord for decreasing the adhesion promoter in the coating rubber to be adhered with the steel cord. The latter technique is disclosed in, for example, JP-A-10-324753.

Incidentally, since the adhesion promoters, particularly adhesion promoters such as cobalt metal salt and the like are expensive, the decrease of the adhesion promoter in the coating rubber is effective to not only improve the performances of the tire but also reduce the compounding cost of rubber and is important from a viewpoint of source-saving.

However, the change in the kind of the adhesion promoter is only the application of a local optimization. Since the Co content is obliged to be basically the same, it is unavoidable to cause two-conflicting condition that when the initial adhesion property is improved, the adhesion durability lowers or the blooming property lowers.

On the other hand, the method of locating the adhesion promoter as a thin film between the coating rubber and the cord as disclosed in JP-A-10-324753 is possible to certainly remove the compounding of Co in the coating rubber. However, a ratio of Co diffused in the coating rubber becomes inversely large before the adhesion reaction, so that it is required to arrange the thin film containing the adhesion promoter at a thickness of about several ten µm and hence it can not be said that the effect of decreasing Co is sufficient and a further improvement is desired.

As to the adhesion between the coating rubber and the steel cord made of brass-plated filament(s), there should be considered various requirements that not only the initial adhesion property is excellent but also there is not caused a problem resulted from the deterioration of rubber material including an adhesion boundary face between cord and rubber when the tire is placed in a deterioration environment during the use, and further the operability at the tire production step is improved and the compounding cost is controlled and the like.

As mentioned above, it is a first principal requirement that the initial adhesion property is excellent as regards the adhesion property between the steel cord made of brass-plated filament(s) and the rubber coating it. For this end, it is examined to control the brass plating properties on the surface of the filament, and there are reported various examination results on a plating composition, particularly a plating composition on an outermost surface, a plated thickness, an influence of an oxidation degree of copper and zinc and the like. Also, there are proposals on the reduction of a phosphoric acid coating layer produced in the drawing to exist on the outermost surface and contributing to ensure the drawability.

However, the steel wire is required to take a work strengthening by repeatedly subjecting a wire rod of, for example, about 5 mm to a drawing, so that the change in the plating influencing upon the drawing is naturally restricted. In fact, a surface brass-plated layer applied to the wire and conducting an adhesion to rubber is largely different from a matrix portion to be plated or the wire rod in the chemical composition. For instance, the ratio of Cu and Zn contents is reversed, or the plated surface is frequently covered with a phosphoric acid coating or zinc oxide to suppress the activity of the plated layer itself.

Furthermore, when the tire is placed in the deterioration environment during the use, it is important to cause no problem resulted from the deterioration of the rubber material including the adhesion boundary between cord and rubber as previously mentioned. In this connection, the conventional adhesion promoter containing sulfur is effective for promoting the adhesion reaction, but does not contribute to control the adhesion when the rubber-cord composite in the tire or the like is exposed to water or oxygen (or active gas in air) under a heat environment and may promote the adhesion deterioration according to circumstances. Therefore, when the tire and the like are used under a thermally severe environment co-existing a relatively large amount of water and air, e.g. a high-temperature and high-humidity zone such as subtropical zones of Southeast Asia, it is important to improve so-called adhesion properties after the deterioration such as adhesion property in the resistance to moisture heat and the like in addition to the improvement of the initial adhesion property. However, it is difficult to simultaneously establish the initial adhesion property and the adhesion properties after the deterioration.

In order to solve these problems on the adhesion property, JP-A-6-49783 proposes a technique focusing attention on the amount of phosphoric acid at the surface of the wire constituting the steel cord.

However, this publication discloses that as the amount of phosphoric acid remaining on the surface of the wire becomes large, the adhesion properties after the deterioration are excellent under a high-temperature and high-humidity environment but it is difficult to ensure the initial adhesion property, while as the remaining phosphoric acid becomes small, the initial adhesion property is improved but the adhesion properties after the deterioration become insufficient. For this end, it is generally recognized that it is difficult to simultaneously establish both the properties.

DISCLOSURE OF THE INVENTION

It is, therefore, a first object of the invention to establish a way for giving an excellent adhesion property between a steel cord and a coating rubber in the brass plating applied to a wire constituting the steel cord even if an adhesion promoter usually added to a coating rubber composition for the steel cord is decreased or is not added.

In conjunction with the first object, a second object of the invention is to establish a way of strongly ensuring an adhesion property to rubber in the brass plating applied to the wire constituting the steel cord by removing limitations on an outermost plated surface, which have hitherto been limited in a production process of the steel cord.

It is a third aspect of the invention to establish a way capable of improving adhesion properties after deterioration in addition to an initial adhesion property as an adhesion property in the brass plating applied to the wire constituting the steel cord.

The inventors have made various studies with respect to factors controlling an adhesion reaction between brass plating and rubber in order to achieve the first object, and found that when a phosphorus compound in a surface layer region of a brass plating is reduced as far as possible, an adhesion is completed in a very short time under a remarkably fast adhesion reaction inherent to the brass and that when the chemical composition of the brass plating is same, the adhesion property to rubber is substantially principally governed by the phosphorus compound in the plated surface layer. And also, it has been confirmed that the wire having the above reduced phosphorus compound in the plated surface layer region can ensure the adhesion in a short time even if a cobalt salt as an adhesion promoter in rubber to be adhered is reduced or is not added.

Moreover, the control of an amount of phosphorus compound or phosphorus adhered to the wire surface to a given range with respect to the adhesion property to rubber is disclosed, for example, in JP-B-7-8971, International Publication 97/23311 and the like. However, it is difficult to well maintain the adhesion property to rubber by such an adjustment of the phosphorus adhered amount even when the adhesion promoter is reduced or is not added.

Also, the phosphorus compound is a reaction product between the brass and an extreme-pressure additive component among liquid lubricants used in the drawing of the wire and has a function of reducing friction between a die and the wire to control a temperature rise on the surface of the wire, so that it is an essential component in the drawing of the wire, and it is not too much to say that it is substantially impossible to conduct the wire drawing without such a component. Therefore, the phosphorus compound is naturally included in the plated layer on the surface of the wire after the drawing. Particularly, it is unavoidable that the phosphorus compound is included in the plated layer of the mass-produced wire.

Then, the inventors have made further examinations on the factors controlling the adhesion reaction between the brass plating and the rubber in order to achieve the second object, and found that when the chemical composition of the brass plating is same, the adhesion property to rubber is substantially principally governed by the presence or absence of a difference between copper content in the outermost surface of the plated layer and copper content in the plated layer itself.

In case of producing the wire by plating before the drawing, it is unavoidable that the chemical composition in the outermost surface of the plated layer in the resulting wire differs from the chemical composition of the plated layer itself. Concretely, it has been found that the copper content in the outermost surface of the plated layer is always lower than that of the plated layer.

Furthermore, the inventors have examined the adhesion property from various angles by strictly making up the plated surface layer with free use of a precise instrumental analysis, which is not used up to now, and a modifying way of a cord production process with respect to the factor controlling the adhesion reaction between the brass plating and the cord in order to achieve the third object, and elucidated that it is possible to simultaneously improve the initial adhesion property and the adhesion properties after the deterioration.

That is, it has newly been found that it is very important to control a distribution of copper concentration from the surface of the plated layer in the wire toward an inside thereof as to the adhesion properties after the deterioration. At the same time, it has been found that the distribution of copper concentration from the surface of the plated layer toward the inside thereof is varied by various factors such as lubricant component and temperature in the drawing, pass schedule, die material, drawing rate and the like and hence it is necessary to strictly control these factors in the production process.

The invention is based on the above knowledge and a gist and construction thereof are the followings 1–8.
1. A steel wire for the reinforcement of rubber articles formed by subjecting a peripheral face of a wire to a brass plating, characterized in that an amount of phosphorus included as an oxide in a surface layer region from a surface of the brass plating up to a depth of 5 nm in a radial direction of the wire is controlled to not more than 1.5 atomic %.
2. A steel wire for the reinforcement of rubber articles according to the item 1, wherein a ratio of copper to a total amount of copper and zinc in the surface layer region is 50–80 atomic %.
3. A steel wire for the reinforcement of rubber articles according to the item 2, wherein a copper content in the brass plated layer is uniform in the radial direction of the wire.
4. A steel wire for the reinforcement of rubber articles according to the item 1, wherein when a distribution of a ratio of atomicity of copper to total atomicity of copper, zinc, carbon and oxygen at a region from the surface of the brass plating up to a depth of 6 nm in the radial direction of the wire is approximated to quadratic function, a parameter in a variable term of second degree of the quadratic function is not more than −0.2 (atomic %/(nm)$^2$).

5. A steel wire for the reinforcement of rubber articles according to any one of the items 1 to 4, wherein an average thickness of the brass plated layer is 0.13–0.35 μm.

6. A steel wire for the reinforcement of rubber articles according to any one of the items 1 to 5, wherein a ratio of copper to sum of copper and zinc in the brass plated layer is 60–70% by weight, and a ratio of copper to sum of copper and zinc in the surface layer region is 15–45 atomic %.

7. A steel wire for the reinforcement of rubber articles according to any one of the items 1 to 6, wherein a diameter of the wire is not more than 0.40 mm.

8. A steel cord for the reinforcement of rubber articles, characterized by twisting a plurality of wires described in any one of the items 1 to 7.

9. A tire comprising a carcass toroidally extending between a pair of bead portions as a skeleton and a belt disposed outside the carcass in a radial direction, characterized in that the steel wire described in any one of the items 1 to 7 or the steel cord described in the item 8 is used in either the carcass or the belt or both.

In general, the steel wire is produced by subjecting a wire rod having, for example, a diameter of about 5 mm to a drawing. In this production process, a lubricant is naturally used. Particularly, the thinning of the wire is carried out at a final drawing step by using dies of about 20 pass placed in a liquid lubricant. In this final drawing step, an extreme pressure is produced between the cord and the die and also a temperature becomes very high, so that it is usual to use a phosphoric acid based lubricant for ensuring the lubricity at an extreme pressure and a high temperature state.

This lubricant reacts with the surface of the wire in the drawing to form a lubrication film layer, i.e. a phosphorus compound layer and mitigates an input under a condition of extreme pressure and high temperature to attain a mass production of the wire. In the production process, therefore, it is unavoidable to incorporate phosphoric acid in the plating of the wire.

The inventors have made various studies on the mechanism wherein phosphoric acid particularly existing at the plating side obstructs the adhesion to rubber as to the adhesion reaction of diffusing copper in the brass plating containing phosphoric acid into rubber side to form $Cu_xS$ to thereby conduct adhesion. As a result, it has newly been found that the adhesion to rubber is not obstructed by phosphoric acid incorporated into a whole of the plating but is obstructed by a phosphorus compound existing in an extreme surface plating layer contacting with rubber, concretely a surface layer region from the surface of the plating up to a depth of 5 nm in the radial direction of the wire. That is, the feature that the phosphorus compound does not remain in the surface layer region of the wire after the final drawing is essential in order to improve the adhesion property to rubber, which is elucidated to be unsolved by controlling an amount of phosphoric acid or phosphorus in the whole of the plated layer, for example, an amount of phosphoric acid or phosphorus as measured by dissolving in a diluted hydrochloric acid in the conventional technique.

Details arriving in the above knowledge will be described below.

At first, wires are prepared by variously changing a pass schedule, a die material, a chemical composition of a lubricant, maturing conditions, a liquid temperature and so on at the drawing step for obtaining the aforementioned wire and then evaluated with respect to the adhesion property to rubber, from which it is clear that the adhesion property to rubber differs in accordance with the wires. As a result of examining conditions common to the wires having a good adhesion property to rubber, the adhesion property to rubber is not comprehended by a copper or phosphorus content in the plated layer as the conventionally general indication as to the adhesion property to rubber. For this end, there have made various studies on the factor exerting upon the adhesion property to rubber, and it has been found that an amount of phosphorus included as an oxide in an extreme surface layer region of the plated layer, concretely a surface layer region from the plated surface up to a depth of 5 nm in the radial direction of the wire is interrelated to the adhesion property to rubber.

In this case, the amount of phosphorus included as the oxide in the surface layer region can be measured according to an X-ray photoelectron spectroscopy. That is, atomicity of all elements and atomicity of phosphorus in the oxide are detected in a region of escape depth of photoelectron measured according to the X-ray photoelectron spectroscopy, and the atomicity of phosphorus in the oxide is represented by an index on the basis that the atomicity of all elements is 100 as an atomic % of phosphorus included in the oxide at the above region. Moreover, the distinction between phosphorus as an oxide and the other phosphorus can be carried out based on a chemical shift of a bonding energy of P=p photoelectron measured by an X-ray photoelectron spectrum of phosphorus atom. Also, the surface layer region up to the depth of 5 nm can be recognized by a kinetic energy and an escape depth of an electron shown in a general literature on a solid photoelectron spectroscopy.

It is important to control the amount of phosphorus included as an oxide in the surface layer region to not more than 1.5 atomic %. When the amount of phosphorus exceeds 1.5 atomic %, the adhesion rate to rubber becomes slow and it is required to conduct a hard operation such as strict regulation of rubber compounding for ensuring the desired adhesion property to rubber or the like, and also an influence of water content in rubber becomes large and the adhesion property to rubber can not be ensured in a winter season causing the lowering of the water content. By controlling the amount of phosphorus to not more than 1.5 atomic %, it is possible to stably obtain the excellent adhesion property to rubber regardless of the water content in rubber.

As to the amount of copper in the plated layer, the copper content in the outermost plated surface participating the adhesion property to rubber is lower than that in the plated inside portion as previously mentioned. As a region having such a low copper content is measured, it is a region ranging from the plated surface up to a depth of 5–10 nm in the radial direction of the wire and being substantially the same region as mentioned on phosphorus. In such a region, it has been found that the copper content has a concentration gradient of gradually decreasing toward the surface.

The lowering of the copper content in the surface layer region of the plated layer is a factor degrading the adhesion property to rubber irrespectively of the same plating composition. In order to avoid the influence by the lowering of the copper content, it is important that the ratio of copper to sum of copper and zinc in the surface layer region is not less than 50 atomic %. Preferably, the copper content in the plated layer is made uniform in the radial direction of the wire. That is, it is recommended that copper has no concentration gradient.

On the other hand, when the ratio of copper to sum of copper and zinc in the surface layer region exceeds 80 atomic %, there is caused a disadvantage of lowering heat-resistant adhesion property and water-proof adhesion property.

Further, the inventors have made the following examinations on the adhesion property to rubber, particularly adhesion properties after the deterioration.

At first, the adhesion properties after the degradation, for example, the deterioration of the adhesion property when the rubber article is used under a high-temperature and high-humidity environment results from the fact that $Cu_xS$ participating in the initial adhesion is decomposed by water and oxygen and zinc in the plating reacts with water and oxygen to progress zinc-removal. In order to improve the adhesion properties after the deterioration, therefore, it is effective that the initial adhesion layer is uniform and dense and has a plating composition hardly progressing the zinc-removal. Concretely, it is effective to control the concentration distribution of copper from the surface of the plated layer in the depth direction thereof as mentioned later.

That is, the concentration distribution of copper is controlled in a region from the plated surface up to a depth of 6 nm in the radial direction of the wire. The reason why the range controlling the concentration distribution of copper is the region from the plated surface up to the depth of 6 nm is due to the fact that this region is a region capable of diffusing copper in the plating dominating the uniformity and denseness of the adhesion layer, i.e. Cu required for forming $Cu_xS$.

In the region ranging up to the depth of 6 nm, it is important that when a distribution of a ratio of atomicity of copper to total atomicity of copper, zinc, carbon and oxygen in the radial direction of the wire is approximated to quadratic function, a parameter in a variable term of second degree of the quadratic function is not more than $-0.2$ (atomic %/(nm)$^2$).

As an example of the distribution of the ratio of atomicity of copper to total atomicity of copper, zinc, carbon and oxygen in the radial direction of the wire is shown in FIG. 1, when a line segment L connecting measured values of copper concentration every depth of 1 nm in the region from the plated surface up to the depth of 6 nm in the radial direction of the wire is grasped as a quadratic function and represented by the following quadratic equation:

$$y=a(x-b)^2-\{(b^2-4ac)/4a\},$$

the concentration distribution of copper is controlled so that the parameter a in the variable term of second degree of the line segment L is not more than $-0.2$ (atomic %/(nm)$^2$).

As shown by a comparative example in FIG. 1, it is common that the concentration distribution of copper in the conventional plated layer linearly increases from the plated surface toward the inside thereof (parameter in the variable term of second degree is close to zero). On the contrary, in the plated layer having the controlled concentration distribution of copper according to the invention, there is a characteristic that since the parameter in the variable term of second degree in the quadratic function is minus or a downward open slope, the copper concentration violently increases toward the inside of the plating. Moreover, the concentration distribution shown in FIG. 1 shows results obtained by quantifying copper atoms at each and every depth while repeating an ion etching from the plated surface toward the inside thereof.

The reason why the adhesion properties after the deterioration are improved by giving the above concentration distribution of copper to the surface layer of the plating is guessed due to the fact that since the copper concentration inside the plating is higher that that in the surface layer in the formation of $Cu_xS$, copper existing at rubber side produces an easily diffusing state. The adhesion properties after the deterioration are not always improved as the absolute value of copper becomes higher. Particularly, the feature that the parameter in the variable term of second degree is not more than $-0.2$ (atomic %/(nm)$^2$) has an effect of violently improving the adhesion property in the resistance to moisture heat.

Also, it is preferable that the average thickness of the plated layer is 0.13–0.35 µm. When the average thickness of the plated layer is less than 0.13 µm, a portion exposing an iron matrix increases to obstruct the initial adhesion property, while when it exceeds 0.35 µm, the adhesion reaction is excessively progressed by heat in the use of the rubber article and hence only a brittle adhesion is obtained.

Further, it is preferable that the ratio of copper to sum of copper and zinc in the brass plated layer is 60–70% by weight and the ratio of copper to sum of copper and zinc in the surface layer region is 15–45 atomic %. Firstly, when the ratio of copper to sum of copper and zinc in the plated layer as a whole is less than 60% by weight, the drawability is degraded and the productivity is obstructed by wire breaking and hence the mass production becomes difficult, and also it is difficult to control the copper content in the surface layer region as mentioned later to not less than 15 atomic %. While, when it exceeds 70% by weight, the heat-resistant adhesion property and the waterproof adhesion property are degraded and the sufficient durability can not be maintained under a tire exposed environment, and also it is difficult to control the copper content in the surface layer region as mentioned later to not more than 45 atomic %.

And also, when the ratio of copper to sum of copper and zinc in the surface layer region is less than 15 atomic %, even if the amount of phosphorus in the surface layer region is limited to not more than 1.5 atomic %, the adhesion reaction to rubber is poor and it is difficult to ensure the further excellent adhesion property to rubber. While, when it exceeds 45 atomic %, there is caused a disadvantage of lowering heat-resistant adhesion property and water-proof adhesion property.

The diameter of the wire is advantageous to be not more than 0.40 mm. When it exceeds 0.40 mm, surface strain becomes large if the rubber article used is subjected to repetitive strain under a bending deformation and hence buckling is easily caused.

The above wire can form a steel cord suitable as a reinforcing member of a rubber article, particularly a carcass or a belt of a tire by twisting a plurality of such wires. When the wire is applied to a belt of a passenger tire, particularly a passenger radial tire, the adhesion rate to rubber becomes fast, and it is possible to largely shorten a curing time of the tire. On the other hand, when the wire is applied to a carcass of a tire for truck and bus, particularly a radial tire for truck and bus, the adhesion rate to rubber becomes fast in the bead portion, and it is possible to improve the bead portion durability in addition to the shortening of the curing time.

In order to render the amount of phosphorus included in the oxide at the surface layer region, the phosphorus amount included in the oxide at the surface layer region can be controlled by conducting adjustments of pass schedule in the drawing, shape and angle of entrance or approach of the die, die material and composition of lubricant alone or in a proper combination thereof. Especially, it is very effective to conduct the drawing by using a die made of a material having an excellent self-lubricity and an excellent cutting property such as a sintered diamond die in a final pass or in last several passes including the final pass among the dies of about 20 passes at a final drawing step while using a lubricant containing an extreme-pressure additive in the usual manner at the final drawing step.

This way is effective even when the distribution of a ratio of atomicity of copper to total atomicity of copper, zinc, carbon and oxygen in the region from the brass plated surface up to the depth of 6 nm in the radial direction of the wire is approximated to quadratic function and a parameter in a variable term of second degree of the quadratic function is not more than −0.2 (atomic %/(nm)$^2$).

On the other hand, it is desirable to adopt the following way in order to provide the plated layer in which the ratio of copper to sum of copper and zinc in the surface layer region is not less than 50 atomic % and copper has no concentration gradient. That is, a mechanical abrasion capable of removing the brass plated layer from the surface of the wire at an order of several nm with a cotton cloth impregnated with an organic solvent or the like is adaptable. The production of industrial scale is made possible by properly incorporating the mechanical abrasion into the production process of the wire.

In the heavy duty tires such as tires for truck and bus, tires for construction vehicles and the like, since the reinforcing degree with the cords becomes higher, a wrapping wire is helically wound around a bundle of plural twisted filaments to strengthen the bundle and maintain the bundle at a given shape to thereby sufficiently develop a role as the cord. It is naturally required that this wrapping wire surely adheres to rubber coating the steel cord, so that a peripheral face of the wrapping wire is subjected to a brass plating.

In the heavy duty tires used under an inflation of higher pressure, cords having a so-called multi-layer twisting structure or a strand twisting structure as shown, for example, in FIG. 2 are used as a cord ruling the reinforcement. In this type of the cord, since a wrapping wire 2 is helically wound on a peripheral face of a bundle of many filaments 1, even if a large bending input is applied to the tire during the running under loading, the loosening of the filaments is prevented by the action of the wrapping wire 2 and hence the cord has an excellent durability including a resistance to buckling fatigue.

Since the wrapping wire 2 is helically wound on the peripheral face of the filament bundle 3 as shown in FIG. 3, the wrapping wire 2 is easily moved in an axial direction, for example, during the running of the tire under loading, and hence the wrapping wire 2 is relatively shifted to a coating rubber 4 accompanied with the running for a long time to cause a fear that an adhesion failure 5 is produced therebetween as shown in FIG. 3(a). In an extreme case, the adhesion failure 5 proceeds from FIG. 3(b) to FIG. 3(c) and finally the wrapping wire is broken by rubbing with the coating rubber and further the filaments themselves in the cord are fretted and abraded with each other to bring about the lowering of the cord tenacity.

This problem can be solved by omitting the wrapping wire. However, it is actually difficult to omit the wrapping wire in order to satisfy various conditions required for the tire such as control of cord buckling under the running under loading and so on when the tire is used under a heavy load.

Rather, when the adhesion property of the wrapping wire to rubber is improved, it is not necessary to discuss the omission of the wrapping wire and the lowering of the cord tenacity resulted from the adhesion failure between the wrapping wire and rubber, and hence it is possible to provide rubber articles such as tires and the like having an excellent durability against the large bending input.

In order to improve the adhesion property between the wrapping wire and rubber while maintaining the excellent resistance to buckling fatigue through the wrapping wire, therefore, it is advantageous to control the amount of phosphorus included as an oxide in the surface layer region from the brass plated surface of the wrapping wire up to the depth of 5 nm in the radial direction to not more than 1.5 atomic % likewise the case of the above cord body.

Even in the wrapping wire, it is effective that the ratio of copper to sum of copper and zinc in the surface layer region is 50–80 atomic %, and that when the distribution of a ratio of number of copper atoms to total number of copper, zinc, carbon and oxygen atoms in the radial direction of the wire is approximated to quadratic function, the parameter in a variable term of second degree of the quadratic function is not more than −0.2 (atomic %/(nm)$^2$) as being expected for the improvement of the adhesion properties after the deterioration.

BRIEF DESCRIPTION OF THE DRAWINGS

FIG. 4 is a graph showing a Cu concentration distribution in a depth direction of a plated layer.

BEST MODE FOR CARRYING OUT THE INVENTION

EXAMPLE 1

Figure 1:
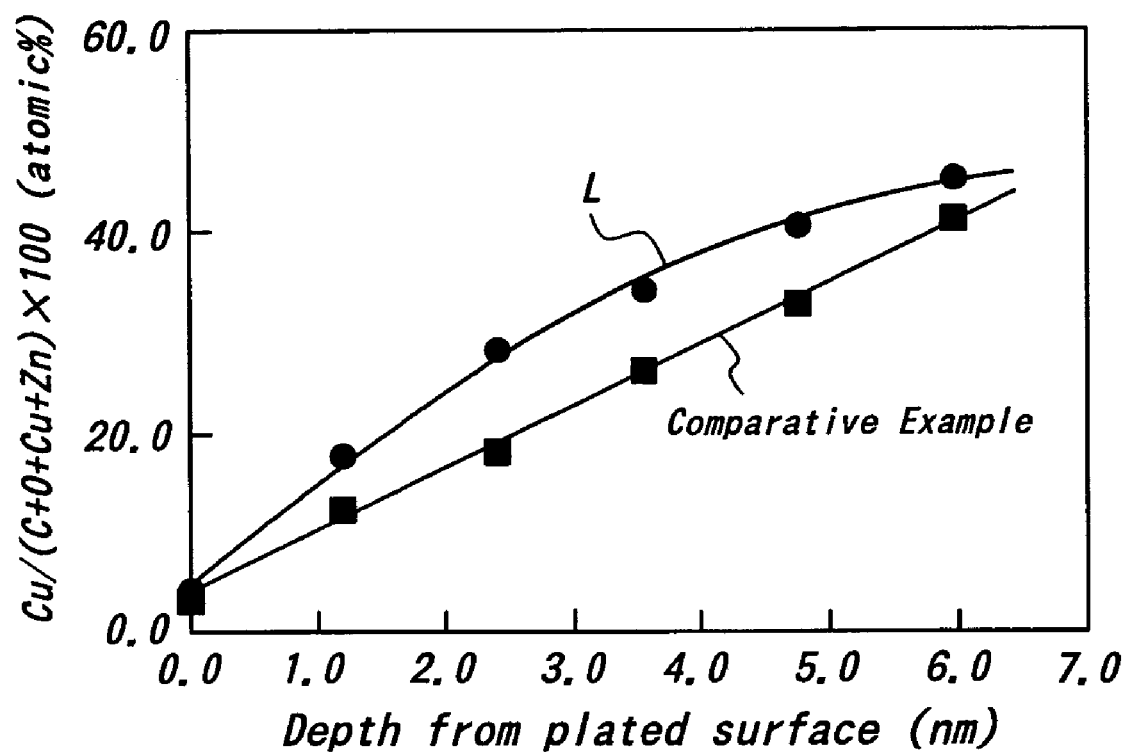
FIG. 1 is a graph showing a concentration distribution of copper in a depth direction of a plated layer.
Figure 2:
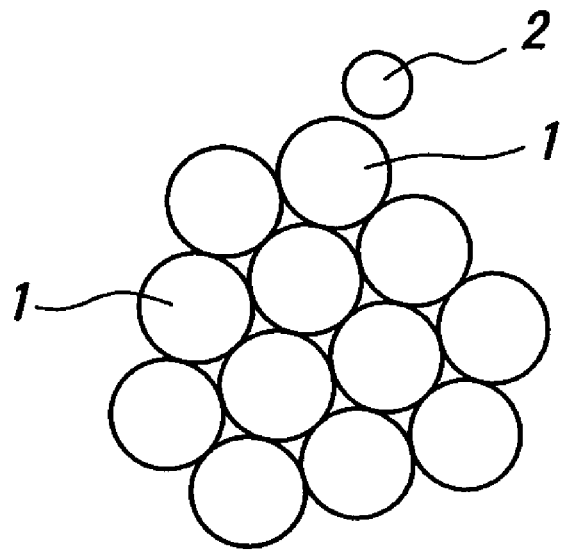
FIG. 2 is a diagrammatically section view illustrating a cord structure.
Figure 2:
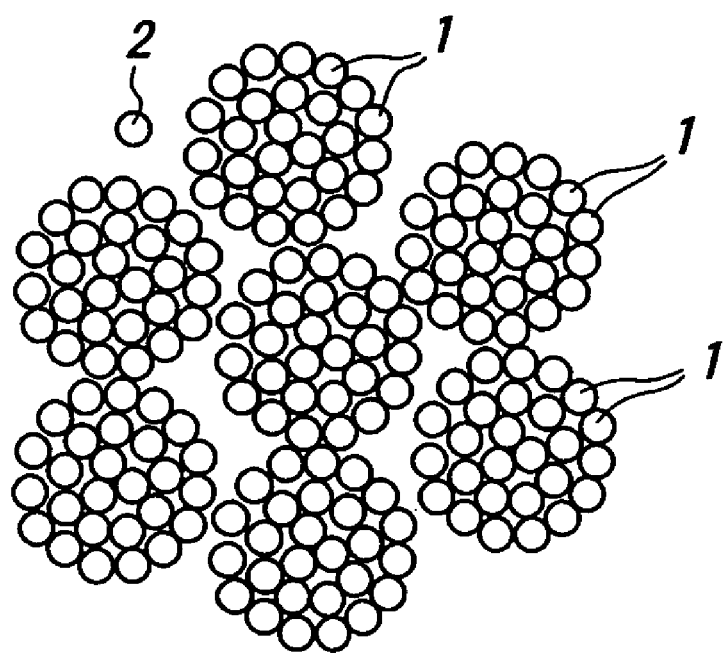
Figure 3:
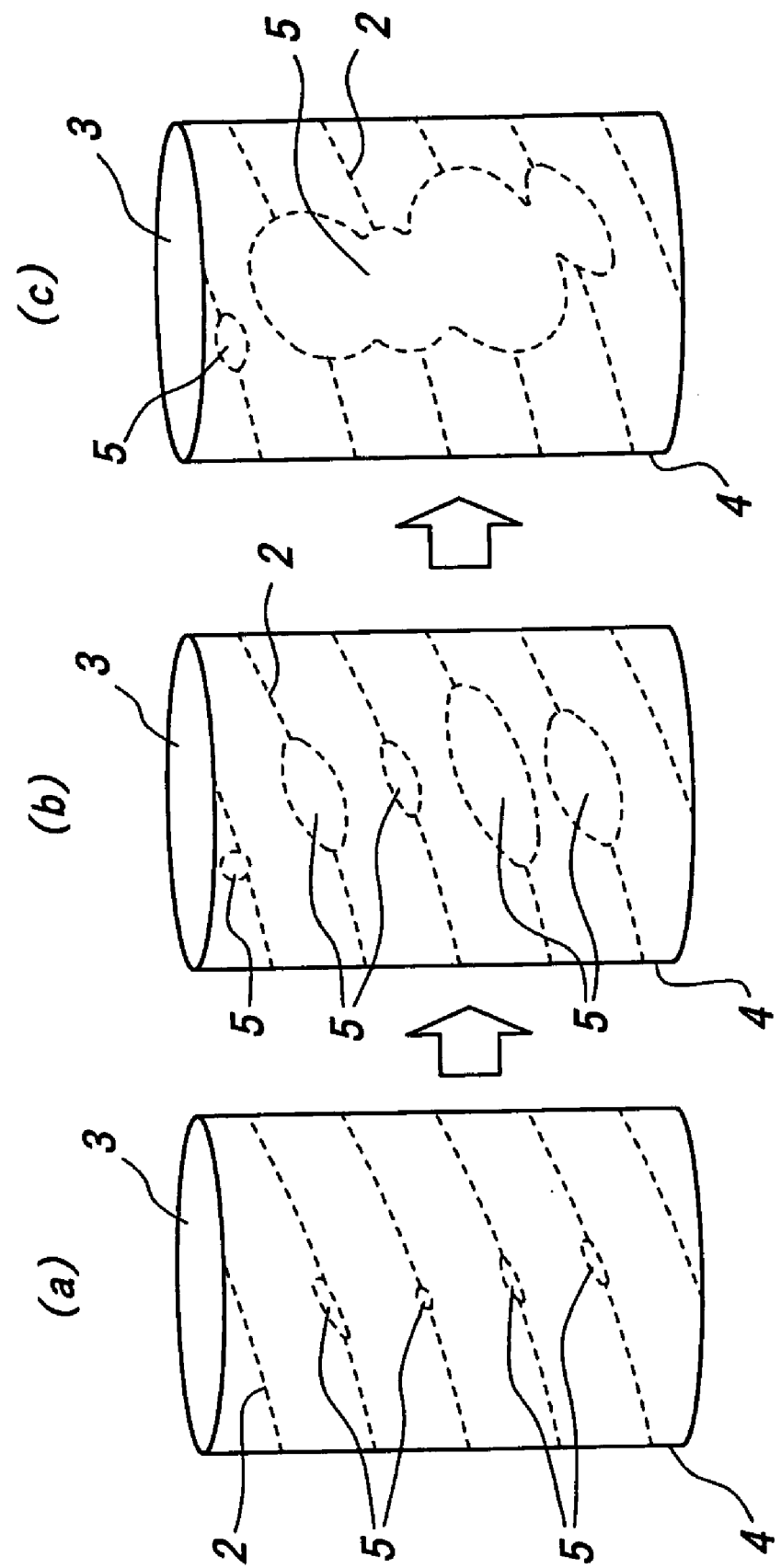
FIG. 3 is a schematic view illustrating an adhesion failure between a wrapping wire and a coating rubber and its progress.

With respect to steel cords produced according to specifications shown in Tables 1-2 to 1-4, a test for adhesion property to rubber is carried out according to a rubber adhesion test method defined in Reference of JIS G3510 (1992). The results are shown in Tables 1-5 to 1-8. A rubber compounding used in this adhesion test is shown in Table 1-9. Moreover, Tables 1-5 and 1-6 show adhesion properties when a cobalt metal salt is added in an amount usually used in a coating rubber, while Tables 1-7 and 1-8 show adhesion properties to coating rubber in case of adding no cobalt salt. Further, the steel cords shown in Table 1-1 are mainly used as a belt cord in passenger car tires, tires for small-size truck and the like, while the steel cords shown in Table 1-2 are mainly used as a belt cord and a carcass ply cord in tires for truck and bus.

Also, the quantitative determination of phosphorus in the surface layer region of the plated layer is conducted by an X-ray photoelectron spectroscopy, in which atomicities of C, Cu, Zn, O, P and N existing in the plated surface layer region of the wire are measured at an analyzing area of 20–30 μmφ not affected by curvature of the wire to determine a ratio of atomicity of P when total atomicity of C, Cu, Zn, O, P and N is 100. The atomicity of each of the atoms is determined by using count number of photoelectron of each of C: $C_{1S}$, O: $O_{1S}$, P: $P_{2P}$, Cu: $Cu_{2P3/2}$, Zn: $Zn_{2P3/2}$ and N: $N_{1S}$ and correcting with the respective sensitivity coefficient.

For instance, the detected atomicity of phosphorus [P] can be determined by the following equation:

[P]=$F_P$ (sensitivity coefficient of $P_{2P}$)×(count of $P_{2P}$ photoelectron per constant time)

Also, the detected atomicity with respect to the other atoms is determined in the same manner as mentioned above, from which results a relative atomic % of phosphorus can be determined by the following equation:

P %={[P]/([Cu]+[Zn]+[C]+[O]+[N]+[P])}×100

Moreover, when the surface of the wire before the analysis is covered with an oil or the like or contaminated with an organic substance, it is washed with a proper solvent and further subjected to a slight argon ion etching to an extent not modifying the surface, if necessary.

TABLE 1-1

|  |  | Comparative Example 1-1 | Invention Example 1-1 | Invention Example 1-2 | Comparative Example 1-2 | Invention Example 1-3 | Invention Example 1-4 |
|---|---|---|---|---|---|---|---|
| Cord construction | | 1 × 3 × 0.30 (mm) | 1 × 3 × 0.30 (mm) | 1 × 3 × 0.30 (mm) | 1 × 5 × 0.225 (mm) | 1 × 5 × 0.225 (mm) | 1 × 5 × 0.225 (mm) |
| Extreme pressure additive in drawing | | use | use | use | use | use | use |
| Tensile strength of wire (N/mm$^2$) | | 3400 | 3400 | 3400 | 3300 | 3300 | 3300 |
| Plating properties | Cu/Zn composition | 63/37 | 63/37 | 63/37 | 63/37 | 63/37 | 63/37 |
| | Plating thickness (μm) | 0.25 | 0.25 | 0.25 | 0.21 | 0.21 | 0.21 |
| | Surface layer region(*1) Cu content(*2) (atomic %) | 28 | 31 | 35 | 30 | 32 | 35 |
| | P content in plated layer (*3) (mg/m$^2$) | 1.17 | 1.18 | 1.05 | 0.91 | 0.91 | 0.82 |
| | Surface layer region(*1) P content (atomic %) | 2.50 | 1.50 | 1.00 | 1.70 | 1.20 | 0.95 |
| Rubber composition used | Compounding No. | A | A | A | A | A | A |
| | Amount of cobalt salt(*4) | 2 parts by weight | 2 parts by weight | 2 parts by weight | 2 parts by weight | 2 parts by weight | 2 parts by weight |

(*1): region from plated surface up to a depth of 5 nm in radial direction of wire
(*2): ratio of Cu to sum of Cu + Zn
(*3): quantify by dissolving plated layer with a diluted hydrochloric acid (weight per unit surface area of cord)
(*4): based on 100 parts by weight of rubber

TABLE 1-2

|  |  | Comparative Example 1-3 | Invention Example 1-5 | Invention Example 1-6 | Comparative Example 1-4 | Invention Example 1-7 | Invention Example 1-8 |
|---|---|---|---|---|---|---|---|
| Cord construction | | (1 + 6) × 0.34 (mm) | (1 + 6) × 0.34 (mm) | (1 + 6) × 0.34 (mm) | (3 + 8) × 0.21 (mm) | (3 + 8) × 0.21 (mm) | (3 + 8) × 0.21 (mm) |
| Extreme pressure additive in drawing | | use | use | use | use | use | use |
| Tensile strength of wire (N/mm$^2$) | | 3200 | 3200 | 3200 | 3700 | 3700 | 3700 |
| Plating properties | Cu/Zn composition | 63/37 | 63/37 | 63/37 | 63/37 | 63/37 | 63/37 |
| | Plating thickness (μm) | 0.32 | 0.32 | 0.32 | 0.21 | 0.21 | 0.21 |
| | Surface layer region(*1) Cu content(*2) (atomic %) | 28 | 30 | 33 | 30 | 32 | 36 |
| | P content in plated layer(*3) (mg/m$^2$) | 1.12 | 1.07 | 1.14 | 0.66 | 0.65 | 0.64 |
| | Surface layer region(*1) P content (atomic %) | 2.00 | 1.40 | 1.00 | 1.80 | 1.30 | 0.94 |
| Rubber composition used | Compounding No. | A | A | A | A | A | A |
| | Amount of cobalt salt(*4) | 2 parts by weight | 2 parts by weight | 2 parts by weight | 2 parts by weight | 2 parts by weight | 2 parts by weight |

(*1): region from plated surface up to a depth of 5 nm in radial direction of wire
(*2): ratio of Cu to sum of Cu + Zn
(*3): quantify by dissolving plated layer with a diluted hydrochloric acid (weight per unit surface area of cord)
(*4): based on 100 parts by weight of rubber

TABLE 1-3

|  | Comparative Example 1-5 | Invention Example 1-9 | Invention Example 1-10 | Invention Example 1-11 |
|---|---|---|---|---|
| Cord construction | 1 × 5 × 0.225 (mm) | 1 × 5 × 0.225 (mm) | 1 × 5 × 0.225 (mm) | 1 × 5 × 0.225 (mm) |
| Extreme pressure additive in drawing | use | use | use | use |
| Tensile strength of wire (N/mm$^2$) | 3300 | 3300 | 3300 | 3300 |

TABLE 1-3-continued

|  |  | Comparative Example 1-5 | Invention Example 1-9 | Invention Example 1-10 | Invention Example 1-11 |
|---|---|---|---|---|---|
| Plating properties | Cu/Zn composition | 63/37 | 63/37 | 63/37 | 63/37 |
|  | Plating thickness (μm) | 0.25 | 0.21 | 0.21 | 0.21 |
|  | Surface layer region(*1) Cu content(*2) (atomic %) | 30 | 32 | 35 | 38 |
|  | P content in plated layer(*3) (mg/m$^2$) | 0.91 | 0.91 | 0.82 | 0.80 |
|  | Surface layer region(*1) P content (atomic %) | 1.70 | 1.20 | 0.95 | 0.80 |
| Rubber composition used | Compounding No. | B | B | B | B |
|  | Amount of cobalt salt(*4) | 0 part by weight | 0 part by weight | 0 part by weight | 0 part by weight |

(*1): region from plated surface up to a depth of 5 nm in radial direction of wire
(*2): ratio of Cu to sum of Cu + Zn
(*3): quantify by dissolving plated layer with a diluted hydrochloric acid (weight per unit surface area of cord)
(*4): based on 100 parts by weight of rubber

TABLE 1-4

|  |  | Comparative Example 1-6 | Invention Example 1-12 | Invention Example 1-13 | Invention Example 1-14 |
|---|---|---|---|---|---|
| Cord construction |  | (3 + 8) × 0.21 (mm) | (3 + 8) × 0.21 (mm) | (3 + 8) × 0.21 (mm) | (3 + 8) × 0.21 (mm) |
| Extreme pressure additive in drawing |  | use | use | use | use |
| Tensile strength of wire (N/mm$^2$) |  | 3700 | 3700 | 3700 | 3700 |
| Plating properties | Cu/Zn composition | 63/37 | 63/37 | 63/37 | 63/37 |
|  | Plating thickness (μm) | 0.21 | 0.21 | 0.21 | 0.21 |
|  | Surface layer region(*1) Cu content(*2) (atomic %) | 30 | 32 | 36 | 38 |
|  | P content in plated layer(*3) (mg/m$^2$) | 0.66 | 0.65 | 0.64 | 0.61 |
|  | Surface layer region(*1) P content (atomic %) | 1.80 | 1.31 | 0.94 | 0.75 |
| Rubber composition used | Compounding No. | B | B | B | B |
|  | Amount of cobalt salt(*4) | 0 part by weight | 0 part by weight | 0 part by weight | 0 part by weight |

(*1): region from plated surface up to a depth of 5 nm in radial direction of wire
(*2): ratio of Cu to sum of Cu + Zn
(*3): quantify by dissolving plated layer with a diluted hydrochloric acid (weight per unit surface area of cord)
(*4): based on 100 parts by weight of rubber

TABLE 1-5

|  |  | Comparative Example 1-1 | Invention Example 1-1 | Invention Example 1-2 | Comparative Example 1-2 | Invention Example 1-3 | Invention Example 1-4 |
|---|---|---|---|---|---|---|---|
| Adhesion properties | Rubber adhesion ratio after the curing of 160° C. × 5 minutes (%) | 0 | 60 | 100 | 40 | 100 | 100 |
|  | Rubber adhesion ratio after the curing of 160° C. × 9 minutes (%) | 20 | 100 | 100 | 80 | 100 | 100 |
|  | Rubber adhesion | 85 | 100 | 100 | 95 | 100 | 100 |

TABLE 1-5-continued

|  |  | Comparative Example 1-1 | Invention Example 1-1 | Invention Example 1-2 | Comparative Example 1-2 | Invention Example 1-3 | Invention Example 1-4 |
|---|---|---|---|---|---|---|---|
|  | ratio after the curing of 160° C. × 13 minutes (%) |  |  |  |  |  |  |
|  | Rubber adhesion ratio after the curing of 160° C. × 18 minutes (%) | 100 | 100 | 100 | 100 | 100 | 100 |

TABLE 1-6

|  |  | Comparative Example 1-3 | Invention Example 1-5 | Invention Example 1-6 | Comparative Example 1-4 | Invention Example 1-7 | Invention Example 1-8 |
|---|---|---|---|---|---|---|---|
| Adhesion properties | Rubber adhesion ratio after the curing of 145° C. × 7.5 minutes (%) | 0 | 75 | 100 | 0 | 80 | 100 |
|  | Rubber adhesion ratio after the curing of 145° C. × 10 minutes (%) | 0 | 90 | 100 | 15 | 90 | 100 |
|  | Rubber adhesion ratio after the curing of 145° C. × 15 minutes (%) | 15 | 95 | 100 | 45 | 95 | 100 |
|  | Rubber adhesion ratio after the curing of 145° C. × 20 minutes (%) | 60 | 97 | 100 | 85 | 95 | 100 |
|  | Rubber adhesion ratio after the curing of 145° C. × 30 minutes (%) | 60 | 100 | 100 | 98 | 100 | 100 |

TABLE 1-7

|  |  | Comparative Example 1-5 | Invention Example 1-9 | Invention Example 1-10 | Invention Example 1-11 |
|---|---|---|---|---|---|
| Adhesion properties | Rubber adhesion ratio after the curing of 160° C. × 7 minutes (%) | 0 | 50 | 60 | 90 |
|  | Rubber adhesion ratio after the curing of 160° C. × 9 minutes (%) | 25 | 80 | 85 | 98 |
|  | Rubber adhesion ratio after the curing of 160° C. × 11 minutes (%) | 45 | 90 | 95 | 100 |
|  | Rubber adhesion ratio after the curing of 160° C. × 13 minutes (%) | 60 | 97 | 98 | 100 |
|  | Rubber adhesion ratio after the curing of 160° C. × 15 minutes (%) | 70 | 100 | 100 | 100 |

TABLE 1-8

|  |  | Comparative Example 1-6 | Invention Example 1-12 | Invention Example 1-13 | Invention Example 1-14 |
|---|---|---|---|---|---|
| Adhesion properties | Rubber adhesion ratio after the curing of 160° C. × 5 minutes (%) | 5 | 20 | 80 | 95 |

TABLE 1-8-continued

|  | Comparative Example 1-6 | Invention Example 1-12 | Invention Example 1-13 | Invention Example 1-14 |
|---|---|---|---|---|
| Rubber adhesion ratio after the curing of 160° C. × 9 minutes (%) | 20 | 50 | 90 | 100 |
| Rubber adhesion ratio after the curing of 160° C. × 13 minutes (%) | 60 | 90 | 95 | 100 |
| Rubber adhesion ratio after the curing of 160° C. × 18 minutes (%) | 70 | 98 | 99 | 100 |
| Rubber adhesion ratio after the curing of 160° C. × 15 minutes (%) | 70 | 100 | 100 | 100 |

TABLE 1-9

|  | Compounding No. | |
|---|---|---|
|  | A | B |
| NR | 100 | 100 |
| HAF | 50 | 50 |
| ZnO | 5 | 5 |
| Co salt of naphthenic acid (10%) | 2 | 0 |
| Sulfur | 5 | 5 |
| Vulcanization accelerator DZ | 0.5 | 0.5 |

Comparative Example 1-1 in Table 1-5 shows a result of an adhesion peeling test between a steel cord of 1×3×0.30 (mm) using the conventional wire and a coating rubber usually used, while Comparative Example 1-2 shows a result of an adhesion peeling test between a steel cord of 1×5×0.225 (mm) using the conventional wire and a coating rubber usually used.

On the other hand, Invention Example 1-1 is an example wherein P in the plated surface layer region of the final wire is reduced to 1.50 atomic % by properly changing a drawing lubrication condition and using a sintered diamond die as a die in a suitable latter stage in the final drawing under the same heat treatment as in Comparative Example 1-1. Similarly, Invention Example 1-2 is an example wherein P in the plated surface layer region of the final wire is reduced to 1.00 atomic %.

A rubber adhesion ratio of 100% is not ensured unless a curing time at 160° is 18 minutes in Comparative Example 1-1 and about 13 minutes in Comparative Example 1-2. On the contrary, the rubber adhesion ratio of 100% is attained by curing at 160° C. for 9 minutes in Invention Example 1-1, while the rubber adhesion ratio of 100% is ensured even for about 5 minutes, which does not completely cure the rubber, in Invention Example 1-2. Similarly, the rubber adhesion ratio of 100% is obtained at 160° C. for 5 minutes in Invention Examples 1-3 and 1-4 because it is possible to more easily reduce P in the surface layer region though it is guessed that the diameter of the wire is thin and the tensile strength is low. When the amount of the adhesion promoter usually added is used in the rubber composition, if P amount in the surface layer region of the plated wire is not more than 1.5 atomic %, the adhesion rate can significantly be improved and it is possible to extensively improve the productivity such as shortening of curing time in the tire or the like.

Then, Table 1-2 shows a case that a cord of a layer construction is mainly used in a large-size tire, and Invention Examples 1-5 and 1-6 are cases of cords particularly suitable for the belt that the diameter is as thick as 0.34 mm and the tensile strength is higher. When the Invention Examples 1-5 and 1-6 are compared with Comparative Example 1-3 conducting the same production process up to the drawing, the Invention Examples 1-5 and 1-6 attain the significant improvement of the adhesion rate as shown in Table 1-6 because the reduction of P amount in the plated surface layer region is successful.

Also, Invention Examples 1-7 and 1-8 are cases of cords suitable for carcass ply that the diameter is as thin as 0.21 mm and the tensile strength is a highest class. When the Invention Examples 1-7 and 1-8 are compared with Comparative Example 1-4 conducting the same production process up to the drawing, the Invention Examples 1-7 and 1-8 attain the significant improvement of the adhesion rate because the reduction of P amount in the plated surface layer region is successful. That is, as the P amount in the plated surface layer region is reduced to not more than a half of a usual level (not more than 1.00 atomic %), the rubber adhesion ratio of 100% can be ensured at 145° C. in about 7.5 minutes. In case of the large-size tire, it is general to conduct the curing at a lower temperature as compared with the small-size tire in view of the tire durability, so that the curing time becomes naturally long and is frequently restricted to the adhesion rate of rubber. Therefore, the significant improvement of the adhesion rate is immediately made possible to bring about the increase of the production number of tires. Furthermore, the shortening of the curing time is related to the control of degrading the properties of the over-cured material and can contribute to improve the tire performances.

Comparative Example 1-5 shown in Table 1-7 shows a result of an adhesion peeling test between a steel cord of 1×5×0.225 (mm) using the conventional filaments and rubber obtained by removing the adhesion promoter from the usually used coating rubber. On the contrary, Invention Examples 1-9, 1-10 and 1-11 are cases of reducing P amount in the surface layer region of the final plated wire to 1.2-0.8 atomic % by properly changing a drawing lubrication condition and using a sintered diamond die as a die in a suitable latter stage in the final drawing under the same heat treatment as in Comparative Example 1-5. In Comparative Example 1-5, the rubber adhesion ratio of 100% can not be ensured even in the curing of 160° C. for 15 minutes. On the other hand, the adhesion property to rubber can be improved to a level exceeding the adhesion property to rubber containing the adhesion promoter shown in Comparative Example 1-2 by reducing the P amount in the plated surface layer region in the order of Invention Examples 1-9, 1-10 and 1-11.

Comparative Example 1-6 shown in Table 1-8 shows a result of an adhesion peeling test between a steel cord of (3+8)×0.21 (mm) using the conventional filaments and rubber obtained by removing the adhesion promoter from the usually used coating rubber. On the contrary, Invention Examples 1-12, 1-13 and 1-14 are cases of reducing P amount in the surface layer region of the final plated wire to 1.31-0.75 atomic % by properly changing a drawing lubrication condition and using a sintered diamond die as a die in a suitable latter stage in the final drawing under the same heat treatment as in Comparative Example 1-6. In Comparative Example 1-6, the rubber adhesion ratio of 100% can not be ensured even in the curing of 145° C. for 30 minutes and also the adhesion can not be completed. On the other hand, the adhesion property to rubber can be improved to a level exceeding the adhesion property to rubber containing the adhesion promoter shown in Comparative Example 1-4 by reducing the P amount in the plated surface layer region in the order of Invention Examples 1-12, 1-13 and 1-14. Especially, in the Invention Example 1-14, the rubber adhesion ratio of approximately 100% with respect to rubber containing no cobalt can be ensured even in the curing of 145° C. for 10 minutes, so that it is possible to shorten the curing time but also remove various harmful effects of the adhesion promoter.

From the comparisons in the above Tables, it is clear that the wires according to the invention belong to category quite different from techniques disclosed in JP-B-7-8971 and International Publication 97/23311 as a prior art in not only the content but also the effects.

EXAMPLE 2

With respect to steel cords produced according to specifications shown in Tables 2-1 and 2-2, a test for adhesion property to rubber is carried out at room temperature (RT) and a lower temperature of −60° C. (LT) according to a rubber adhesion test method defined in Reference of JIS G3510 (1992), respectively. The results are shown in Tables 2-3 and 2-4. A rubber compounding used in this adhesion test is shown in the aforementioned Table 1-9. Moreover, the steel cords shown in Table 2-1 are mainly used as a belt cord in passenger car tires, tires for small-size truck and the like, while the steel cords shown in Table 2-2 are mainly used as a belt cord and a carcass ply cord in tires for truck and bus.

And also, the distribution of copper concentration (atomic %) in the plated layer in the radial direction of the wire with respect some examples shown in Tables 2-1 and 2-2 is shown in FIG. 4, while the phosphorus concentration (mass %) on the plated surface in these examples is shown in Table 2-5.

In this case, the amount of phosphorus in the surface layer region of the plated layer is quantified in the same manner as in Example 1. Also, the concentration of copper is possible to be quantified in the same manner as mentioned above.

Further, it is possible to measure the distribution of copper concentration from the plated surface toward the inside thereof by combining with ion etching, in which an actual depth can be converted from an etching rate to a brass foil having a known thickness.

Moreover, when the surface of the wire before the analysis is covered with an oil or the like or contaminated with an organic substance, it is washed with a proper solvent and further subjected to a slight argon ion etching to an extent not modifying the surface, if necessary.

TABLE 2-1

|  |  | Comparative Example 2-1 | Invention Example 2-1 | Invention Example 2-2 | Comparative Example 2-2 | Invention Example 2-3 |
|---|---|---|---|---|---|---|
| Cord construction |  | 1 × 3 × 0.30 (mm) | 1 × 3 × 0.30 (mm) | 1 × 3 × 0.30 (mm) | 1 × 3 × 0.30 (mm) | 1 × 3 × 0.30 (mm) |
| Extreme pressure additive in drawing |  | use | use | use | use | use |
| Phosphorus reducing treatment of plated surface |  | none | after drawing | after drawing | on drawing | on and after drawing |
| Tensile strength of wire (N/mm$^2$) |  | 3400 | 3400 | 3400 | 3400 | 3400 |
| Plating properties | Cu/Zn composition | 63/37 | 63/37 | 63/37 | 63/37 | 63/37 |
|  | Plating thickness (μm) | 0.25 | 0.25 | 0.25 | 0.25 | 0.25 |
|  | Surface layer region(*1) P content (atomic %) | 2.50 | 1.50 | 0.90 | 1.00 | 0.1 |
|  | P content in plated layer(*3) (mg/m$^2$) | 1.15 | 1.15 | 1.03 | 1.00 | 1.02 |
|  | Surface layer region(*1) Cu content (atomic %) | 23 | 51 | 53 | 25 | 62.5 |
|  | Cu content from plated surface to depth of 4 mm (atomic %) | 45 | 61 | 62 | 45 | 62.5 |
|  | Cu content from plated surface to depth of 6 mm (atomic %) | 57 | 62.5 | 62.5 | 55 | 62.5 |
| Rubber composition used | Compounding No. | A | A | A | A | A |
|  | Amount of cobalt salt(*4) | 2 parts by weight | 2 parts by weight | 2 parts by weight | 2 parts by weight | 2 parts by weight |

(*1): region from plated surface up to a depth of 5 nm in radial direction of wire
(*2): ratio of Cu to sum of Cu + Zn (atomic %)
(*3): quantify by dissolving plated layer with a diluted hydrochloric acid (weight per unit surface area of cord)
(*4): based on 100 parts by weight of rubber

TABLE 2-2

|  |  | Comparative Example 2-3 | Invention Example 2-4 | Comparative Example 2-4 | Invention Example 2-5 |
|---|---|---|---|---|---|
| Cord construction | | (3 + 8) × 0.21 (mm) | (3 + 8) × 0.21 (mm) | (3 + 8) × 0.21 (mm) | (3 + 8) × 0.21 (mm) |
| Extreme pressure additive in drawing | | use | use | use | use |
| Phosphorus reducing treatment of plated surface | | none | after drawing | on drawing | on and after drawing |
| Tensile strength of wire (N/mm$^2$) | | 3700 | 3700 | 3700 | 3700 |
| Plating properties | Cu/Zn composition | 63/37 | 63/37 | 63/37 | 63/37 |
| | Plating thickness (μm) | 0.21 | 0.21 | 0.21 | 0.21 |
| | Surface layer region(*1) P content (atomic %) | 1.80 | 1.31 | 0.94 | 0.1 |
| | P content in plated layer(*3) (mg/m$^2$) | 1.12 | 1.10 | 1.07 | 1.05 |
| | Surface layer region(*1) Cu content (atomic %) | 30 | 60 | 32 | 62.5 |
| | Cu content (atomic %) at a depth point of 4 mm from plates surface | 49 | 62.5 | 50 | 62.5 |
| | Cu content (atomic %) at a depth point of 6 mm from plates surface | 62.5 | 62.5 | 62.5 | 62.5 |
| Rubber composition used | Compounding No. | B | B | B | B |
| | Amount of cobalt salt(*4) | 0 parts by weight | 0 parts by weight | 0 parts by weight | 0 parts by weight |

(*1): region from plated surface up to a depth of 5 nm in radial direction of wire
(*2): ratio of Cu to sum of Cu + Zn (atomic %)
(*3): quantify by dissolving plated layer with a diluted hydrochloric acid (weight per unit surface area of cord)
(*4): based on 100 parts by weight of rubber

TABLE 2-3

|  |  |  | Comparative Example 2-1 | Invention Example 2-1 | Invention Example 2-2 | Comparative Example 2-2 | Invention Example 2-3 |
|---|---|---|---|---|---|---|---|
| Adhesion properties | Rubber adhesion ratio after the curing of 160° C. × 5 minutes (%) | RT | 0 | 75 | 100 | 100 | 100 |
| | | LT | 0 | 40 | 80 | 70 | 90 |
| | Rubber adhesion ratio after the curing of 160° C. × 9 minutes (%) | RT | 20 | 100 | 100 | 100 | 100 |
| | | LT | 0 | 60 | 90 | 95 | 100 |
| | Rubber adhesion ratio after the curing of 160° C. × 13 minutes (%) | RT | 85 | 100 | 100 | 100 | 100 |
| | | LT | 20 | 90 | 100 | 98 | 100 |
| | Rubber adhesion ratio after the curing of 160° C. × 18 minutes (%) | RT | 100 | 100 | 100 | 100 | 100 |
| | | LT | 50 | 95 | 100 | 100 | 100 |

TABLE 2-4

|  |  |  | Comparative Example 2-3 | Invention Example 2-4 | Comparative Example 2-4 | Invention Example 2-5 |
|---|---|---|---|---|---|---|
| Adhesion properties | Rubber adhesion ratio after the curing of 145° C. × 10 minutes (%) | RT | 5 | 80 | 80 | 100 |
| | | LT | 0 | 25 | 25 | 75 |
| | Rubber adhesion ratio after the curing of 145° C. × 15 minutes (%) | RT | 20 | 95 | 90 | 100 |
| | | LT | 0 | 50 | 55 | 98 |
| | Rubber adhesion ratio after the curing of 145° C. × 20 minutes (%) | RT | 60 | 95 | 95 | 100 |
| | | LT | 10 | 70 | 75 | 100 |
| | Rubber adhesion ratio after the curing of 145° C. × 25 minutes (%) | RT | 70 | 100 | 99 | 100 |
| | | LT | 20 | 95 | 95 | 100 |
| | Rubber adhesion ratio after the curing of 145° C. × 30 minutes (%) | RT | 70 | 100 | 100 | 100 |
| | | LT | 20 | 100 | 100 | 100 |

TABLE 2-5

| | | Surface layer region P content |
|---|---|---|
| Comparative Example 1: | usual drawn product | 2.5 atomic % |
| Invention Example 1: | usual drawing + one polishing treatment | 1.5 atomic % |
| Invention Example 2: | usual drawing + two polishing treatments | 0.9 atomic % |
| Comparative Example 2: | improved drawing | 1.0 atomic % |
| Invention Example 3: | improved drawing + one polishing treatment | 0.1 atomic % |

EXAMPLE 3

With respect to steel cords produced according to specifications shown in Tables 3-1 and 3-2, a test for adhesion property to rubber is carried out according to a rubber adhesion test method defined in Reference of JIS G3510 (1992). Also, adhesion properties after the deterioration are evaluated by the above test for adhesion property to rubber after it is left to stand in an atmosphere of humidity: 100% and temperature: 75° C. for 2-6 days. The results are shown in Tables 3-3 and 3-4. A rubber compounding used in this adhesion test is shown in the aforementioned Table 1-9. Moreover, Table 3-3 shows adhesion performances in case of adding an amount of cobalt metal salt usually used in the coating rubber, and Table 3-4 shows adhesion performances to the coating rubber incase of adding no cobalt salt. Further, the steel cords shown in Tables 3-1 and 3-2 are mainly used as a belt cord in passenger car tires, tires for small-size truck and the like, while are easily affected by an active component from exterior in use.

And also, the amount of phosphorus in the surface layer region of the plated layer is quantified in the same manner as in Example 1. Moreover, when the surface of the wire before the analysis is covered with an oil or the like or contaminated with an organic substance, it is washed with a proper solvent and further subjected to a slight argon ion etching to an extent not modifying the surface, if necessary.

TABLE 3-1

| | | Comparative Example 3-1 | Comparative Example 3-2 | Invention Example 3-1 | Invention Example 3-2 | Invention Example 3-3 | Invention Example 3-4 |
|---|---|---|---|---|---|---|---|
| Cord construction | | 1 × 3 × 0.30 (mm) | 1 × 3 × 0.30 (mm) | 1 × 3 × 0.30 (mm) | 1 × 3 × 0.30 (mm) | 1 × 3 × 0.30 (mm) | 1 × 3 × 0.30 (mm) |
| Extreme pressure additive in drawing | | use | use | use | use | use | use |
| Tensile strength of wire (N/mm$^2$) | | 3400 | 3400 | 3400 | 3400 | 3400 | 3400 |
| Plating properties | Cu/Zn composition | 63/37 | 63/37 | 63/37 | 63/37 | 63/37 | 63/37 |
| | Plating thickness (μm) | 0.25 | 0.25 | 0.25 | 0.25 | 0.25 | 0.25 |
| | Surface layer region (*1) Cu content (*2) | 30 | 30 | 31 | 31 | 31 | 31 |
| | Second parameter of copper concentration distribution at a depth region of 6 mm | −0.2 | −0.016 | −0.25 | −0.3 | −0.5 | −0.78 |
| | P content in plated layer (*3) (mg/m$^2$) | 1.98 | 1.70 | 1.80 | 2.01 | 1.80 | 1.50 |
| | Surface layer region (*1) P content (atomic %) | 2.50 | 1.50 | 1.00 | 1.10 | 1.00 | 0.90 |
| Rubber composition used | Compounding No. | A | A | A | A | A | A |
| | Amount of cobalt salt (*4) | 2 parts by weight | 2 parts by weight | 2 parts by weight | 2 parts by weight | 2 parts by weight | 2 parts by weight |

(*1): region from plated surface up to a depth of 5 nm in radial direction of wire
(*2): ratio of Cu to sum of Cu + Zn (atomic %)
(*3): quantify by dissolving plated layer with a diluted hydrochloric acid (weight per unit surface area of cord)
(*4): based on 100 parts by weight of rubber

TABLE 3-2

| | | Comparative Example 3-3 | Comparative Example 3-4 | Invention Example 3-5 | Invention Example 3-6 | Invention Example 3-7 | Invention Example 3-8 |
|---|---|---|---|---|---|---|---|
| Cord construction | | 1 × 3 × 0.30 (mm) | 1 × 3 × 0.30 (mm) | 1 × 3 × 0.30 (mm) | 1 × 3 × 0.30 (mm) | 1 × 3 × 0.30 (mm) | 1 × 3 × 0.30 (mm) |
| Extreme pressure additive in drawing | | use | use | use | use | use | use |
| Tensile strength of wire (N/mm$^2$) | | 3400 | 3400 | 3400 | 3400 | 3400 | 3400 |
| Plating properties | Cu/Zn composition | 63/37 | 63/37 | 63/37 | 63/37 | 63/37 | 63/37 |
| | Plating thickness (μm) | 0.25 | 0.25 | 0.25 | 0.25 | 0.25 | 0.25 |
| | Surface layer region (*1) Cu content (*2) | 30 | 30 | 31 | 31 | 31 | 31 |
| | Second parameter of copper concentration distribution at a depth region of 6 mm | −0.2 | −0.016 | −0.25 | −0.3 | −0.5 | −0.78 |
| | P content in plated layer (*3) (mg/m$^2$) | 1.98 | 1.70 | 1.80 | 2.01 | 1.80 | 1.50 |
| | Surface layer region (*1) P content (atomic %) | 2.50 | 1.50 | 1.00 | 1.10 | 1.00 | 0.90 |

TABLE 3-2-continued

|  |  | Comparative Example 3-3 | Comparative Example 3-4 | Invention Example 3-5 | Invention Example 3-6 | Invention Example 3-7 | Invention Example 3-8 |
|---|---|---|---|---|---|---|---|
| Rubber composition used | Compounding No. | B | B | B | B | B | B |
|  | Amount of cobalt salt (*4) | 2 parts by weight | 2 parts by weight | 2 parts by weight | 2 parts by weight | 2 parts by weight | 2 parts by weight |

(*1): region from plated surface up to a depth of 5 nm in radial direction of wire
(*2): ratio of Cu to sum of Cu + Zn (atomic %)
(*3): quantify by dissolving plated layer with a diluted hydrochloric acid (weight per unit surface area of cord)
(*4): based on 100 parts by weight of rubber

TABLE 3-3

|  |  | Comparative Example 3-1 | Comparative Example 3-2 | Invention Example 3-1 | Invention Example 3-2 | Invention Example 3-3 | Invention Example 3-4 |
|---|---|---|---|---|---|---|---|
| Initial adhesion property | Rubber adhesion ratio after the curing of 160° C. × 5 minutes (%) | 0 | 90 | 100 | 100 | 100 | 100 |
|  | Rubber adhesion ratio after the curing of 160° C. × 9 minutes (%) | 20 | 100 | 100 | 100 | 100 | 100 |
|  | Rubber adhesion ratio after the curing of 160° C. × 13 minutes (%) | 85 | 100 | 100 | 100 | 100 | 100 |
|  | Rubber adhesion ratio after the curing of 160° C. × 18 minutes (%) | 100 | 100 | 100 | 100 | 100 | 100 |
| Adhesion properties after the deterioration of 75° C. × 100% RH | Rubber adhesion ratio after the curing of 160° C. × 18 minutes and the deterioration of 2 days | 50 | 10 | 100 | 100 | 100 | 100 |
|  | Rubber adhesion ratio after the curing of 160° C. × 18 minutes and the deterioration of 4 days | 15 | 0 | 90 | 98 | 100 | 100 |
|  | Rubber adhesion ratio after the curing of 160° C. × 18 minutes and the deterioration of 6 days | 0 | 0 | 50 | 75 | 95 | 100 |

TABLE 3-4

|  |  | Comparative Example 3-3 | Comparative Example 3-4 | Invention Example 3-5 | Invention Example 3-6 | Invention Example 3-7 | Invention Example 3-8 |
|---|---|---|---|---|---|---|---|
| Initial adhesion property | Rubber adhesion ratio after the curing of 160° C. × 5 minutes (%) | 0 | 30 | 50 | 50 | 60 | 60 |
|  | Rubber adhesion ratio after the curing of 160° C. × 9 minutes (%) | 10 | 50 | 75 | 75 | 85 | 90 |
|  | Rubber adhesion ratio after the curing of 160° C. × 13 minutes (%) | 40 | 75 | 93 | 93 | 95 | 98 |
|  | Rubber adhesion ratio after the curing of 160° C. × 18 minutes (%) | 50 | 95 | 98 | 98 | 98 | 100 |

TABLE 3-4-continued

| | | Comparative Example 3-3 | Comparative Example 3-4 | Invention Example 3-5 | Invention Example 3-6 | Invention Example 3-7 | Invention Example 3-8 |
|---|---|---|---|---|---|---|---|
| Adhesion properties after the deterioration of 75° C. × 100% RH | Rubber adhesion ratio after the curing of 160° C. × 18 minutes and the deterioration of 2 days | 70 | 50 | 100 | 100 | 100 | 100 |
| | Rubber adhesion ratio after the curing of 160° C. × 18 minutes and the deterioration of 4 days | 50 | 35 | 99 | 100 | 100 | 100 |
| | Rubber adhesion ratio after the curing of 160° C. × 18 minutes and the deterioration of 6 days | 30 | 15 | 95 | 99 | 100 | 100 |

INDUSTRIAL APPLICABILITY

According to the invention, the excellent adhesion property to the coating rubber containing the reduced adhesion promoter or containing no adhesion promoter is ensured by controlling the amount of phosphorus included as an oxide in the surface layer region of the brass plating applied to the wire constituting the steel cord, so that the reduction or omission of the adhesion promoter in the coating rubber material can be realized without sacrificing the performances of the cord-rubber composite.

Further, it is possible to stably provide the wire having an excellent adhesion property to rubber by eliminating factors of deteriorating the adhesion property to rubber irrespectively of the same plating composition.

Moreover, the adhesion properties after the deterioration can be ensured in addition to the initial adhesion property by regulating the concentration distribution of copper in the plating depth direction.

The invention claimed is:

1. A method of producing a steel wire for the reinforcement of rubber articles, which comprises subjecting a peripheral face of a steel wire to a brass plating and then drawing the brass-plated steel wire by using a lubricant containing an extreme-pressure additive and a sintered diamond die at a final drawing step so that an amount of phosphorus included as an oxide in a surface layer region ranging from a surface of the brass plating up to a depth of 5 nm in a radial direction of the wire is controlled to not more than 1.5 atomic %.

2. The method of claim 1, wherein the amount of phosphorus included as an oxide in the surface layer region is controlled by adjusting one or more of (1) a pass schedule for the drawing, (2) shape and angle of entrance or approach of the die, (3) die material, and (4) composition of the lubricant.

3. The method of claim 1, wherein the final drawing step comprises a plurality of passes.

4. The method of claim 3, wherein the sintered diamond die is used in at least the last pass.

5. The method of claim 3, wherein there are about 20 passes.

6. The method of claim 1, further comprising controlling a ratio of copper to a total amount of copper and zinc in the surface layer region to 50–80 atomic %.

7. The method of claim 6, further comprising controlling a copper content in the brass-plated layer to be uniform in the radial direction of the wire.

8. The method of claim 1, further comprising controlling a distribution of a ratio of atomicity of copper to total atomicity of copper, zinc, carbon and oxygen at a region from the surface of the brass plating to be up to a depth of 6 nm in the radial direction of the wire approximating quadratic function, and a parameter in a variable term of second degree of the quadratic function is not more than $-0.2$ (atomic %/(nm)$^2$).

9. The method of claim 1, further comprising controlling an average thickness of the brass-plated layer to be 0.13–0.35 μm.

10. The method of claim 1, further comprising controlling a ratio of copper to sum of copper and zinc in the brass-plated layer to be 60–70% by weight, and a ratio of copper to sum of copper and zinc in the surface layer region to be 15–45 atomic %.

11. The method of claim 1, further comprising controlling a diameter of the wire to be not more than 0.40 mm.

* * * * *